UNITED STATES PATENT OFFICE.

SAMUEL WILLIAMS, OF NEW YORK, N. Y.

IMPROVEMENT IN COMPOSITIONS OF MATTER FOR COVERING THE BOTTOMS OF VESSELS.

Specification forming part of Letters Patent No. 2,498, dated March 18, 1842.

*To all whom it may concern:*

Be it known that I, SAMUEL WILLIAMS, of the city, county, and State of New York, have invented a Composition of Matter for Covering the Bottoms of Ships and other Vessels, as a substitute for copper to guard against the depredations of sea insects, &c.; and I do hereby declare that the following is a full and exact description of the materials and proportions used in its manufacture.

The materials are varnish, boiled oil, arsenic, red lead, sulphur, and sugar of lead, to which may be added any ocher or other coloring substance, according to the fancy of the person using the same. The proportionate quantity of each material is as follows: Half a gallon of varnish, one quart of boiled oil, two pounds of arsenic, two pounds of red lead, half a pound of sulphur, half a pound of sugar of lead, to which may be added, if a copper color is required, one pound of yellow ocher and a small quantity of lamp-black. These several quantities of ingredients will make about a gallon of the composition.

The composition is applied to the vessel while it is boiling hot and with brushes in the same manner as in ordinary painting, and so great a body has the composition that, let the color be what it may, a single coat will completely cover new wood. It also hardens very rapidly. In less than half an hour after it is applied to the vessel it will become sufficiently hard in the atmosphere to cause it to make strong resistance to removal, and the vessel may be launched into the water without any danger of washing off or otherwise destroying the composition. The very moment it becomes cold, either by contact with the atmosphere or with water, it is sufficiently hard for immediate use. For example, if you dip a piece of wood or iron into the boiling composition and then immerse it in cold water it cannot be removed from either without much effort. It is an effectual guard against the adhesion of barnacle to the bottoms of vessels and the depredations of sea insects of every kind, in consequence of the peculiar properties of the composition being baneful to them. Vessels engaged in the West India trade may sail from fifteen to twenty months without requiring a new coat of the composition or being injured by insects.

As this composition is a complete substitute for copper in the defense of vessels against insect depredations, I will mention the fact that it possesses a very great advantage over copper in the cost of covering a vessel's bottom. For example, a vessel, the sheathing of which with copper (which is generally required every two or three years) will cost from one thousand to twelve hundred dollars, may have as complete a defense of this composition put on for seventy-five dollars. Hence there is prodigious saving of expense.

Having thus described the materials and proportions of my newly-invented composition of matter and briefly set forth its chief advantages, it seems necessary only to add that I have fully tested its usefulness and have in my possession the approbatory certificates of several captains sailing from this port whose vessels have been covered with it.

What I claim as my invention, and desire to secure by Letters Patent of the United States, is—

The peculiar admixture of materials in the manufacture of paint or composition of matter for covering the bottoms of ships and other vessels, in manner and for the purposes above described in this specification.

SAMUEL WILLIAMS.

Witnesses:
BERESON J. LOSSING,
WILLIAM BARRITT.